(No Model.) 2 Sheets—Sheet 1.
J. L. YOST.
BICYCLE.
No. 310,858. Patented Jan. 13, 1885.
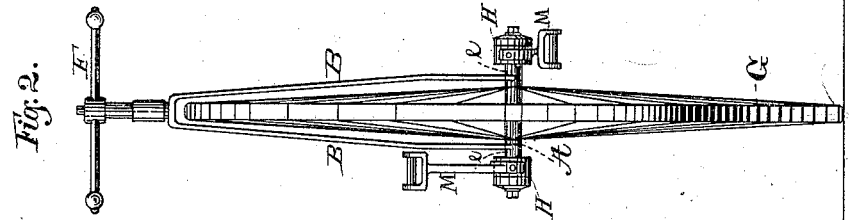
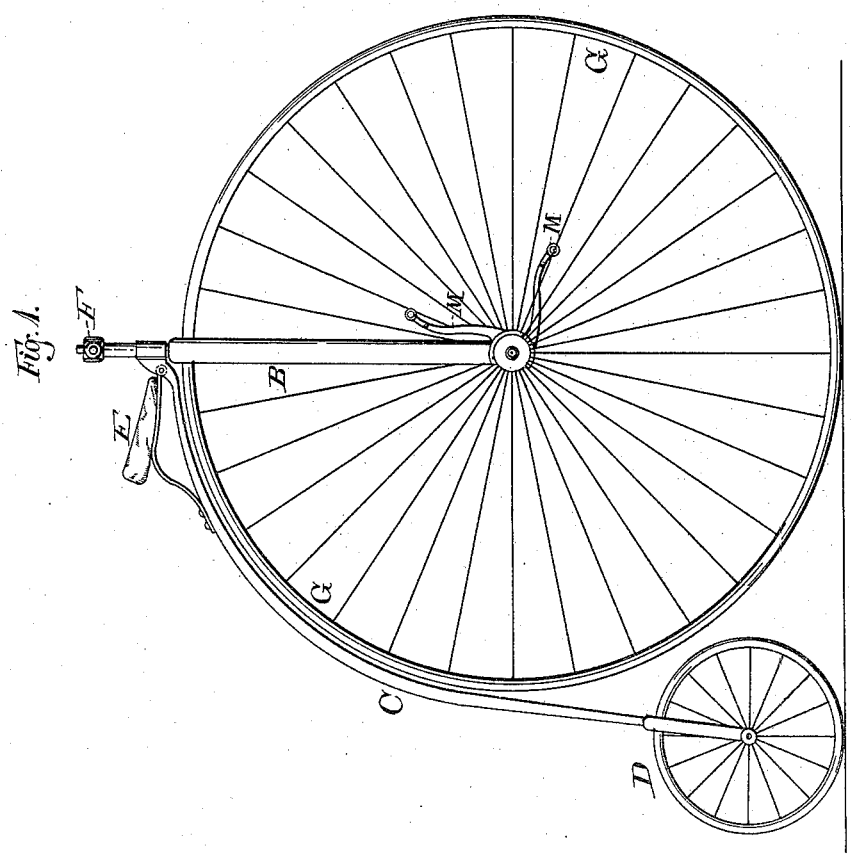
WITNESSES:
Gunvald Aas.
Albert Finkelstone.
INVENTOR
Joseph L. Yost.
BY James A. Whitney
ATTORNEY

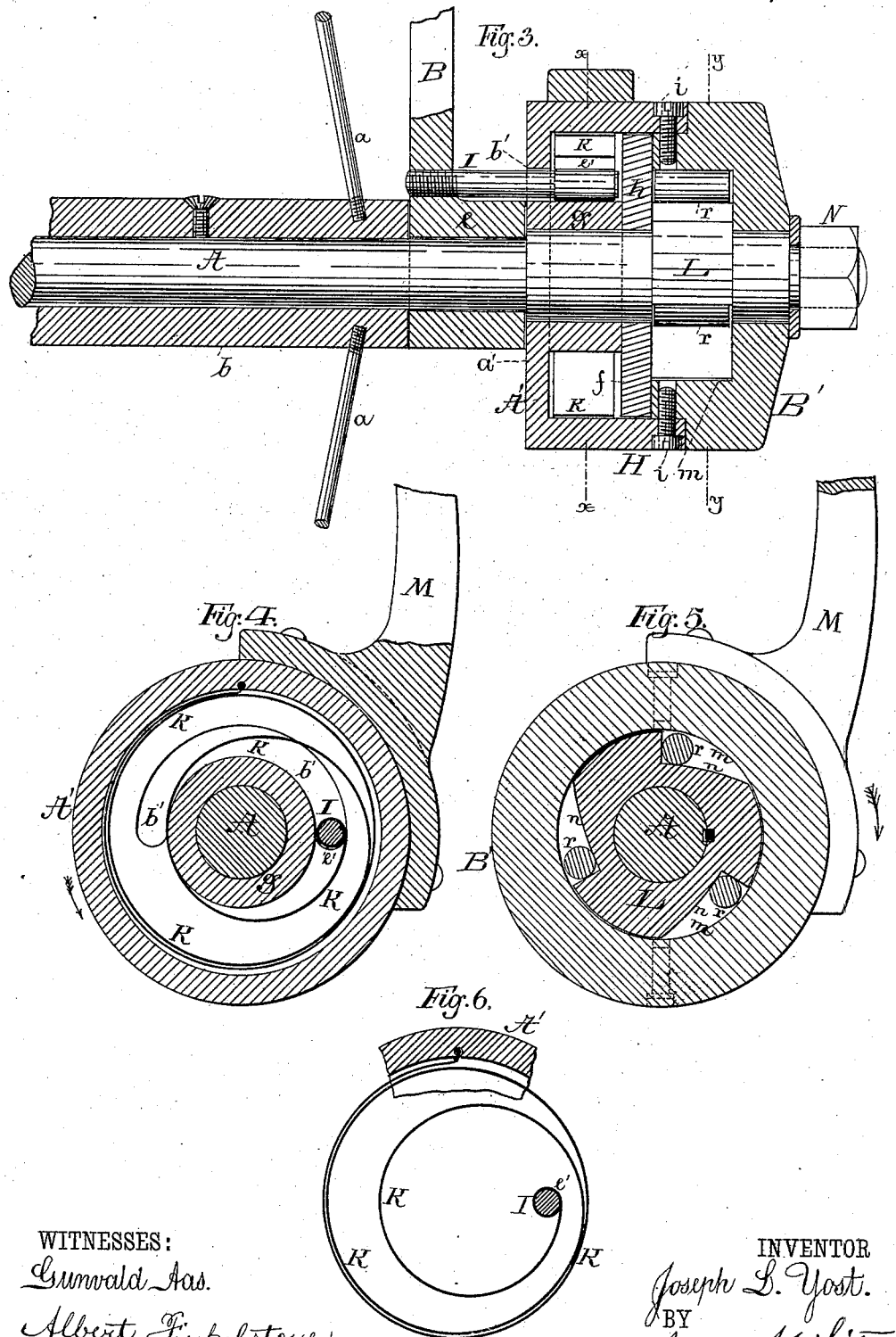

UNITED STATES PATENT OFFICE.

JOSEPH L. YOST, OF WALLINGFORD, CONNECTICUT.

BICYCLE.

SPECIFICATION forming part of Letters Patent No. 310,858, dated January 13, 1885.

Application filed October 18, 1884. (No model.)

*To all whom it may concern:*

Be it known that I, JOSEPH L. YOST, of Wallingford, in the county of New Haven and State of Connecticut, have invented an Improvement in Means of Propelling Vehicles, of which the following is a specification.

This invention relates more particularly to "bicycles," so called, but it may also be applied to tricycles, velocipedes, and, in fact, to the different varieties of wheel-vehicles designed to be propelled by a treadle movement. Its object is to provide a strong, simple, and effective apparatus for the propulsion of such vehicles, and which will be free from the disadvantages of crank mechanism, such as is ordinarily employed for the propulsion of bicycles and the like, and which will also be more free and positive in its action than the substitutes heretofore devised for the crank-movement.

My said invention comprises certain novel combinations of parts whereby said object is effectually secured.

Figure 1 is a side view, and Fig. 2 a front view, illustrating the manner in which my said invention may be applied to a bicycle. Figs. 3, 4, 5, and 6 are on a larger scale, Fig. 3 being a sectional view taken in line with the axle of the vehicle, and illustrating certain parts included in my said invention; Fig. 4, a transverse sectional view taken in the line $x\ x$ of Fig. 3; Fig. 5, a similar view taken in the line $y\ y$ of Fig. 3; and Fig. 6, a side view corresponding to Fig. 4, but illustrating in detail a spring which forms part of the said apparatus.

A is the axle of the wheel or wheels to be rotated thereby, said wheel being fast to said axle.

As represented in Fig. 3, $a$ indicates spokes, and $b$ the hub, of a wheel—as, for example, the wheel of a bicycle.

B is the standard, or, as it may be termed, the "running-gear." In a bicycle this is substantially vertical, as shown in Fig. 1, and may be connected with the rearwardly-extending arm C, to the lower end of which is provided a small running-wheel, D, E being in such case the saddle of the bicycle, and F the usual lever by which the bicycle is guided.

The axle A is capable of rotation in order to revolve the wheel, the latter being indicated at G in Figs. 1 and 2, and its relative position being also indicated by that of its spokes $a$ and hub $b$.

The standard B in a bicycle is astride of the wheel G, and rests upon the axle A by means of its two bearings $e$. H is a shell composed of the two sections A' B'. The section A' is constructed with an annular chamber, $f$, and loose upon the shaft A, with its inner face, $a'$, nearest the axle A bearing against the adjacent end surface of the bearing $e$. Formed in the inner face, $a'$, of said section A' is a semicircular or arc-shaped slot, $b'$, as represented in Figs. 3 and 4. I is a stem or stud, which projects from the standard substantially parallel with the axle A, and the outer end of which extends through the slot $b'$ into the chamber $f$ of the section A'.

K is a coiled spring, one end, $e'$, of which is attached to the stud I, while the opposite end is attached to the section A', so that the tension of said spring tends to turn backward the said section A' upon the axle A, as indicated by the arrow in Fig. 4. The central boss or bearing, $g$, of the section A' may be of such length as to permit an annular plate or washer, $h$, to be placed upon the axle A at the outer end of said boss or bearing $g$, to separate the chamber $f$ from the interior of the section B'. Said section B' has at its inner side a circular chamber, $m$. Passed upon that portion of the axle A within said chamber $m$ is a block, L, recessed at its circumference to provide inclined or tangential planes or surfaces $n$, in which are placed rollers $r$. The internal surface or wall, $m$, is circular and concentric with the axis of the axle A and of the block L, so that when the section B' is moved in the direction of the arrow in Fig. 5 the internal circumferential surface of the chamber $m$—that is to say, of said section B', acting upon the outer sides of the rollers $r$—rolls the same outward upon the inclines or tangents $n$, thereby wedging said rollers between the outward portions of said inclines or tangents $n$ and the aforesaid internal circumference of the section B', this wedging of the rollers $r$ between the section B' and the block L insuring the transmission of the motion in said direction of the section B' to said block L, and consequently to the axle A and its attached wheel. The section B' is attached to the section A' in any suitable manner—as, for example, by the screws *i*, or other devices—so that the sections A' and B' shall operate together as one, thereby forming collectively the shell H. Attached to one or the other of the sections A' or B'—that is to say, to the shell H—is a treadle, M, which may be of any ordinary or suitable construction, and which in a bicycle should be arranged in such relation with the saddle E as to be acted upon by a substantially outward though somewhat forward movement of the foot of the operator, in order that the weight of the operator may re-enforce the movement of the foot in its action upon the treadle, the position being more fully illustrated in Figs. 1 and 2. It is of course to be understood that in a bicycle the apparatus represented in Figs. 3, 4, and 5, as herein explained, is duplicated—that is to say, one such apparatus is placed at one end of the axle A, while the duplicate thereof is placed at the opposite end.

In the operation of the apparatus in a bicycle, the rider or operator operates the treadle alternately, each forward and downward movement of the treadle serving to turn the shell H in a direction indicated by the arrow in Fig. 5, to give a forward motion through the axle A to the wheel, which done, the treadle is released and the spring K, by giving a reversed motion, as indicated by the arrow in Fig. 4, to the shell H, brings upward and backward the treadle M, and also causes the rollers *r* to be rolled backward and inward, practically clear of the circular internal circumference of the chamber *m*, thereby permitting the continued rotation of the axle A in its forward direction when, as for example, acted upon by the duplicate apparatus at the opposite ends of said axle. With the duplicate apparatus, as explained, upon the axle A, said axle runs idle with reference to one of the shells H and its adjunct while it is being acted upon at the other end of the axle, and vice versa. This mechanism acts surely, positively, and easily, and with practically no loss of motion, and, as hereinbefore set forth, enables the treadles to be brought in such relation with the saddle or seat of a bicycle or like vehicle that the action of the foot or limbs of the rider or operator in propelling the vehicle is substantially above the treadles, in such manner as to enable the strength of the limbs and feet to be most advantageously applied to the propulsion of the vehicle. The shell H is made in sections and with the internal annular plate or disk, *h*, for the sake of convenience in construction; but any other construction of the said shell may be adopted which will permit its operation with reference to the spring K, stud or arm I, recessed block L, and rollers *r*. Said shell may be prevented from slipping off the end of the axle A by means of a suitable nut, N, screwed upon the extremity of said axle, or by means of a linchpin or other suitable device.

It will be observed that the slot through which the stud or arm I passes may, when desired, be so proportioned that its opposite end will serve as a stop to limit the throw of the treadle M in both an upward and downward direction.

What I claim as my invention is—

The combination, with an axle, A, and a wheel fast thereon, of a standard or frame, B, provided with a bearing through which said axle runs loose, a stud or arm, I, fast to said standard or frame, a hollow shell, H, arranged to receive the end of said stud or arm I, a spring, K, having one end attached to said shell H and the other end to said stud or arm I, the block L, constructed with inclines or tangents *n*, rollers *r*, and treadle M, all substantially as and for the purpose herein set forth.

JOSEPH L. YOST.

Witnesses:
HARRY E. SEEWELLER,
JOHN W. WELLS.